(12) United States Patent
Tegrotenhuis et al.

(10) Patent No.: US 8,596,341 B2
(45) Date of Patent: Dec. 3, 2013

(54) ENHANCED TWO PHASE FLOW IN HEAT TRANSFER SYSTEMS

(75) Inventors: Ward E. Tegrotenhuis, Kennewick, WA (US); Paul H. Humble, Kennewick, WA (US); Curt A. Lavender, Richland, WA (US); Dustin D. Caldwell, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1265 days.

(21) Appl. No.: 12/133,970

(22) Filed: Jun. 5, 2008

(65) Prior Publication Data

US 2009/0321053 A1 Dec. 31, 2009

(51) Int. Cl.
  *F28D 15/04* (2006.01)
(52) U.S. Cl.
  USPC ................. 165/104.26; 165/104.33; 165/911; 361/700
(58) Field of Classification Search
  USPC ............................................ 165/104.26, 907
  See application file for complete search history.

(56) References Cited

U.S. PATENT DOCUMENTS

| | | | |
|---|---|---|---|
| 3,196,634 A | 7/1965 | Rich | |
| 3,587,730 A | 6/1971 | Milton | |
| 4,371,034 A | 2/1983 | Yamada et al. | |
| 4,458,748 A | 7/1984 | Yamada et al. | |
| 4,509,592 A | 4/1985 | Yamada et al. | |
| 4,632,179 A | 12/1986 | Meijer et al. | |
| 4,825,661 A | 5/1989 | Holtzapple et al. | |
| 4,840,224 A * | 6/1989 | Dietzsch | 165/104.26 |
| 5,560,423 A * | 10/1996 | Larson et al. | 165/104.26 |
| 5,839,290 A | 11/1998 | Nazeri | |
| 6,601,643 B2 | 8/2003 | Cho et al. | |
| 6,609,560 B2 | 8/2003 | Cho et al. | |
| 6,666,909 B1 | 12/2003 | TeGrotenhuis et al. | |
| 6,869,462 B2 | 3/2005 | TeGrotenhuis et al. | |
| 6,875,247 B2 | 4/2005 | TeGrotenhuis et al. | |
| 6,994,151 B2 | 2/2006 | Zhou et al. | |
| 7,051,540 B2 | 5/2006 | TeGrotenhuis et al. | |
| 7,143,818 B2 | 12/2006 | Thayer et al. | |
| 7,156,159 B2 | 1/2007 | Lovette et al. | |
| 7,219,628 B1 | 5/2007 | Krishnamurthy et al. | |
| 7,251,889 B2 | 8/2007 | Kroliczek et al. | |
| 7,277,285 B2 | 10/2007 | Shin et al. | |
| 7,305,850 B2 | 12/2007 | Tonkovich et al. | |
| 7,308,931 B2 | 12/2007 | Pokharna | |
| 7,344,576 B2 | 3/2008 | TeGrotenhuis et al. | |
| 2004/0069460 A1* | 4/2004 | Sasaki et al. | 165/104.26 |
| 2005/0081552 A1* | 4/2005 | Nilson et al. | 62/311 |
| 2005/0230085 A1* | 10/2005 | Valenzuela | 165/104.26 |
| 2007/0163755 A1* | 7/2007 | Kim et al. | 165/104.26 |

* cited by examiner

*Primary Examiner* — Allen Flanigan
(74) *Attorney, Agent, or Firm* — Derek H. Maughan; A. J. Gokcek

(57) ABSTRACT

A family of structures and designs for use in devices such as heat exchangers so as to allow for enhanced performance in heat exchangers smaller and lighter weight than other existing devices. These structures provide separate flow paths for liquid and vapor and are generally open. In some embodiments of the invention, these structures can also provide secondary heat transfer as well. In an evaporative heat exchanger, the inclusion of these structures and devices enhance the heat transfer coefficient of the evaporation phase change process with comparable or lower pressure drop.

17 Claims, 6 Drawing Sheets

ENHANCED TWO PHASE FLOW IN HEAT TRANSFER SYSTEMS

This invention was made with Government support under Contract DE-AC0576RLO1830 awarded by the U.S. Department of Energy. The Government has certain rights in the invention.

BACKGROUND OF THE INVENTION

There exists a current need for high efficiency heat exchange to take place in relatively small areas and applications. In such applications, characteristics such as size, weight, and energy efficiency are primary competitive metrics and principal technology development objectives. Examples of applications where such devices are required include but are not limited to man-portable vapor compression cooling systems, evaporators for portable fuel processors and fuel cell power systems, micro and mini heat pipes for high heat flux heat transfer applications, such as chip cooling; and other applications.

In such applications, the ability to affect evaporation or condensation with relatively higher heat transfer rates, reduced pressure drop, reduced pressure fluctuations, and reduced superheating of the refrigerant vapor provides for reduced size and reduced power demand from increased system efficiency of many such systems. The present invention includes a simplified design for phase-change heating and cooling devices that provides many of the aforementioned advantages while allowing for simplified manufacture and use. While the present invention is described as being implemented in the aforementioned applications it is to be distinctly understood that the invention is not limited thereto but may be variously included and deployed according to the needs and necessities of a user.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present invention is a family of structures, designs and methods that can be incorporated into devices such as heat exchangers so as to make these heat exchangers smaller, lighter weight and/or capable of enhanced performance as compared to other existing devices. These structures facilitate independent flow of liquid and vapor through the structures by providing separate flow paths for different fluid phases. In some embodiments of the invention, the structures segregate or separate phases, such as the separation of vapor generated from liquid during evaporation. In some embodiments of the invention, these structures can also provide secondary areas for heat transfer as well. In an evaporative heat exchanger, the secondary area enhances the overall heat transfer coefficient of the evaporation phase change process with comparable or lower pressure drop. In some embodiments, the structures provide increased interfacial area between the fluids that enhance heat and/or mass transfer between the phases.

In one embodiment of the invention the heat exchanger is an evaporative heat exchanger having at least one wall that defines at least one channel that contains a wick having at least two capillary flow passageways of differing scale lengths. Liquid preferentially fills and flows through some passageways and vapor through others such that liquid and vapor are separated within the channel by the wick as heating of the working fluid takes place. In an evaporative configuration, this allows liquids to be continually, evenly distributed while vapor that is generated is removed from the device. In one embodiment of the invention, the device is used to exchange mass between fluids. The device having at least one wall that defines at least one channel that contains a wick having at least two capillary flow passageways of differing scale lengths that wick liquid at different rates. Liquid preferentially fills and flows through some passageways and vapor through others with a large area of contact between the fluids to allow one or more components of one of the phases to transfer into the other phase. When used for absorption of a vapor into a liquid, this allows the liquid to be nearly saturated with the vapor when the liquid exits the device.

In one embodiment of the invention, the wick is proportioned to substantially fill the volume of the channel and to be in intimate contact with the walls that define the channel. In another embodiment of the invention, the wick is brazed, welded, bonded, soldered or diffusion bonded to the wall. In yet another embodiment of the invention the wick is made of a high thermal conductivity material and provides additional heat transfer capabilities. Examples of the high thermal conductivity material from which the wick may be made include but are not limited to materials such as aluminum, copper, and the like. These devices can be arranged in a variety of configurations including those configurations wherein the two phase flow of liquid is enhanced without superheating. These features of the present invention can be variously configured in a variety of applications according to the needs and necessities of a user.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
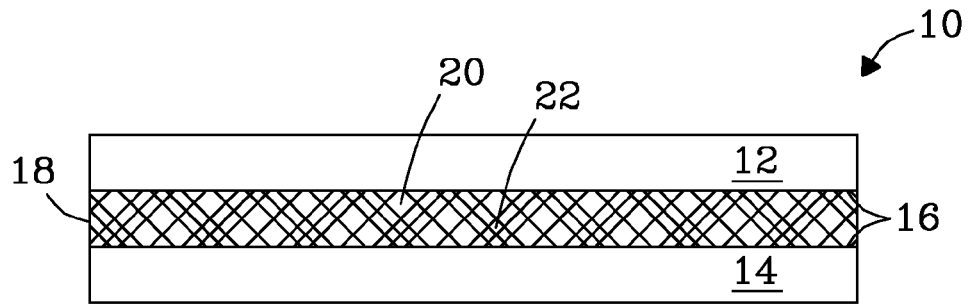
FIG. 1 is a side view of a first preferred embodiment of the present invention

FIGS. 1-3 and 5 show a variety of views of one embodiment of the present invention. FIGS. 4 and 6 show the results of various tests of this embodiment of the present invention which is described hereafter. Referring first to FIG. 1, a side view of one embodiment of the present invention is shown. In this first preferred embodiment of the present invention, the invention is configured for use in a evaporative heat exchanger. This embodiment consists principally of a structure 10 having at least one wall 14, in this case two walls 12, 14 that define a channel 16. Within this channel 16 a wick 18 which defines at least two and preferably a plurality of capillary flow passageways 20, 22. Preferably, this wick 18 is made from a thermally conductive material that extends across substantially the entire channel 16. These capillary flow passageways 20, 22 have at least two different scalar lengths, which are configured to preferentially maintain liquid phase in the flow paths of smaller length scales thus separating the liquid and the vapor. This wick 18 preferably provides multiple flow paths, with different rise heights and multiple time scales. Preferably, this wick 18 is affixed to at least one of the walls 14 that define the channel 16. This affixing may be accomplished in a variety of ways including but not limited to interconnection by a braze, weld, bond, solder or diffusion bond.

Figure 5:
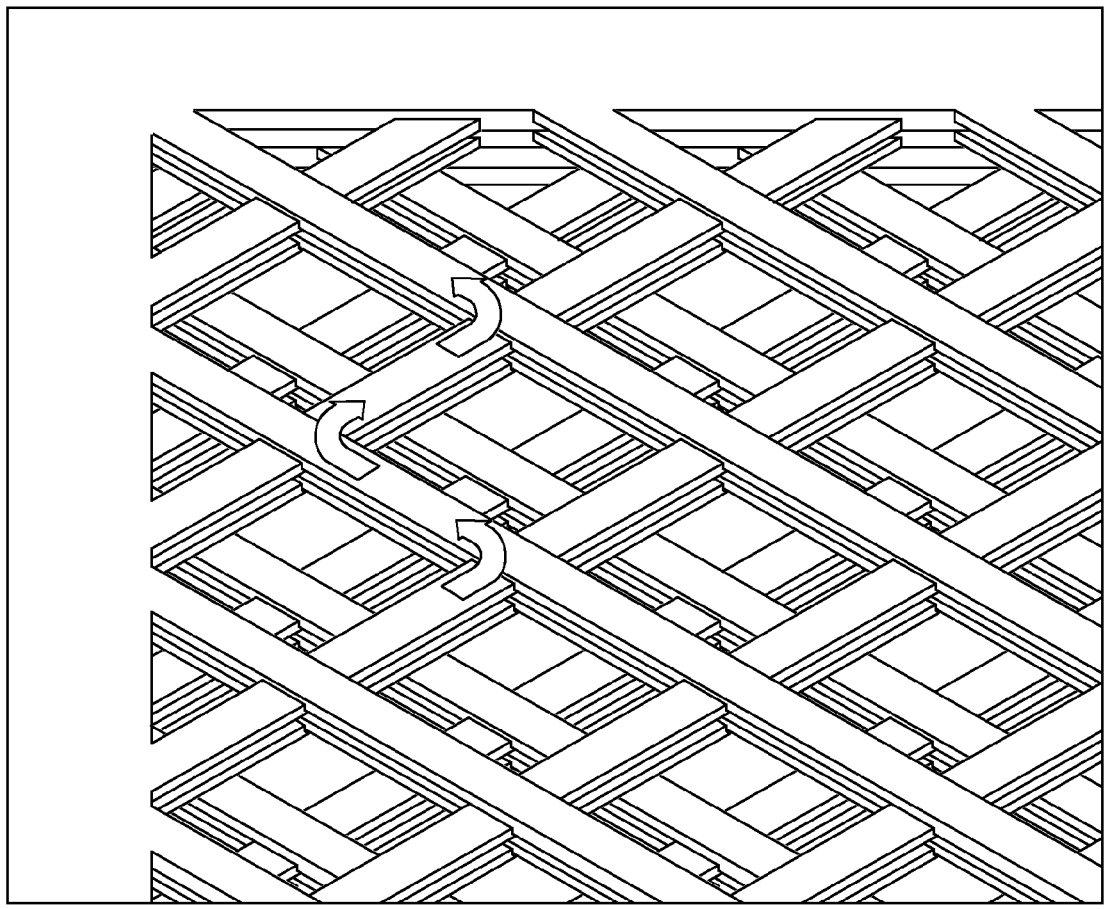
FIG. 5 is a detailed view of one embodiment of a wick in one embodiment of the preset invention.
Figure 6:
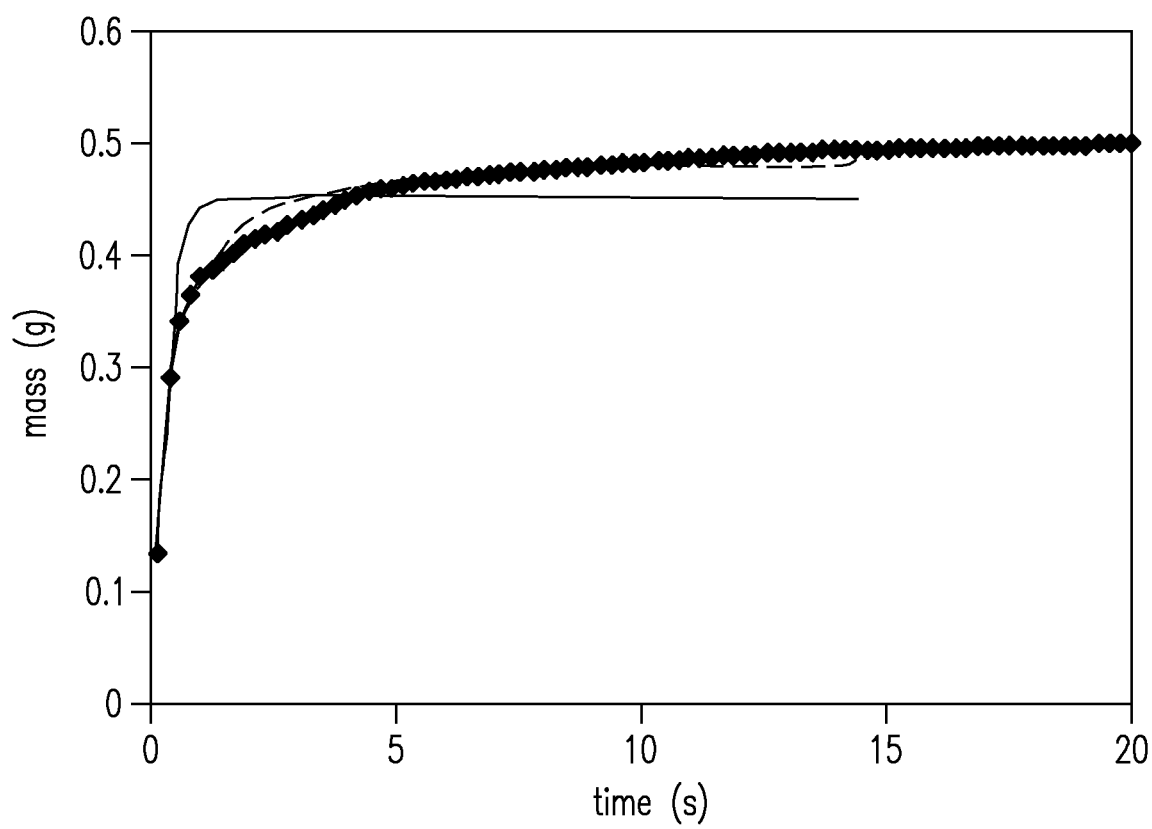
FIG. 6 is a chart showing the rates of capillary flow of materials through the device.

A detailed view of one embodiment of a wick 18 is shown in FIG. 5. In this embodiment of the invention, the wick 18 is made up of a plurality of metal foils each having the same or similar structures that are stacked together. As seen in FIG.5, the wire foils have offset, substantially planar surfaces; when stacked together, the facing offset surfaces of adjacent foil layers are spaced apart to define capillary passages for the flow of the liquid. In the preferred embodiment shown in FIG. 5, the wick 18 is comprised of four layers of expanded metal wire foils. The top two layers form diamond pattern with 0.0025" spacing between the wires that are preferably 0.005"×0.0025". The bottom two layers form the same pattern but are shifted by one half the repeat distance so as to create offset holes. In this embodiment, the offset pattern can continue in a stacking shifting pattern every two layers. In use, liquid will collect and travel between and along the wires in the wick while gas or vapor will flow through the larger holes in the structure in the second capillary mode alternating between layers to flow around the wires. The liquid turns to vapor as it is heated by the wire and will move into the holes and travel through the device. Those portions that are still liquid will move along the wire within the device and will be further heated until vaporization occurs.

Multiple imbibition fronts in such a wick have been observed, particularly with structures made of multiple layers of Delker expanded metal wicks. In these instances liquid is initially observed moving through the material along strands and into corners without filling the structure. A second front is then observed behind the first front that fills the wick volume. When the mass uptake data are plotted, the curve does not follow the characteristic shape that is demonstrated for a porous media having a single front during filling. This is believed to be caused by the multiple capillary modes. Each mode has at least one pathway and preferably multiple pathways through the material that are characterized by a distinct permeability and effective pore radius. These features determine how far and how quickly liquid will imbibe into the material in this mode. In such a configuration only the last mode is volume filling.

For purposes of understanding, the operation of these multiple capillary modes can be likened to a bundle of capillary tubes of differing diameters. If all such tubes have the same contact angle, the smallest tubes have the highest capillary driving force and will fill first. The other tubes will fill successively from smallest to largest with the mode corresponding to the largest diameter tube being 'volume filling'. Using this analogy, the capillary rise data from a multiple capillary mode material is characterized and plotted. Fitting a two capillary mode model to the data for the 3-layer expanded foil wick is shown in FIG. 6. FIG. 6 shows mass uptake data (♦) for a capillary rise experiment with ethylene glycol in a 3-layer wick made of 4Al7-050F Delker expanded metal screens orientated with the flow direction parallel to the long axis of the diamonds. Least squares curve fit of the data to the single-mode capillary rise equation (-) and the dual-mode capillary rise equation (- -). Admitting the second capillary front enables an improved fit of the data and supports the concept of multi-mode capillary wicks.

In this example, the effective pore size radius of the 'fast' mode is 100 µm using a contact angle of 25° while the 'slow' mode is calculated to have an effective pore size radius of 270 µm. The permeability of the fast mode is $2.4 \times 10^{-04}$ cm$^2$ while the slow mode is calculated to be $6.1 \times 10^{-05}$ cm$^2$. These multimode wicks with flow paths having different capillary properties presents possibilities for gas-liquid processing in these structures. When a mixture of a gas and a liquid are forced to flow through this media, the wick material wets the liquid, then the liquid will preferentially segregate to the mode with the smaller pore sizes. The gas will flow through the paths with the larger effective pore size to minimize pressure drop. This then allows for an extremely large contact area between the phases while flowing in this mode, on the order of the internal surface area of the porous media. In addition, the length-scale for transport in the liquid phase should be on the order of the smaller pore size, giving rise to extremely fast transport rates. This level of process intensification reaches a level beyond that explored in planar structures consisting of channels having dimensions of a fraction of a millimeter.

While these structures are shown and described, it is to be distinctly understood that the invention is not limited thereto but may be variously embodied and configured to incorporate a variety of other structures including but not limited to various types of screens, wire mesh; and other porous materials. These wicking properties allow various embodiments of the present invention to be used in several technologies that require two-phase flow of a gas and liquid, including absorbers, desorbers, and distillation devices.

The presence of multiple flow paths with different capillary behavior makes these wick 18 structures particularly suitable for evaporative heat exchangers, because liquid can be distributed throughout the volume containing the structure via the higher capillarity paths. The vapor that is generated can flow out of the device through the more open paths without entraining liquid. The separate flow paths preclude liquid from interfering with vapor flow and causing pressure fluctuations. The combination of separate liquid filling channels and reduced propensity for entraining liquid in the vapor means a higher fraction of the heat transfer area can be used for evaporation and less superheating of the vapor takes place. This also means the flow path can be made shorter and flow area increased for lower pressure drop. In some embodiments, the structure can be open to allow for increased flow area to further reduce pressure drop.

Figure 2A:
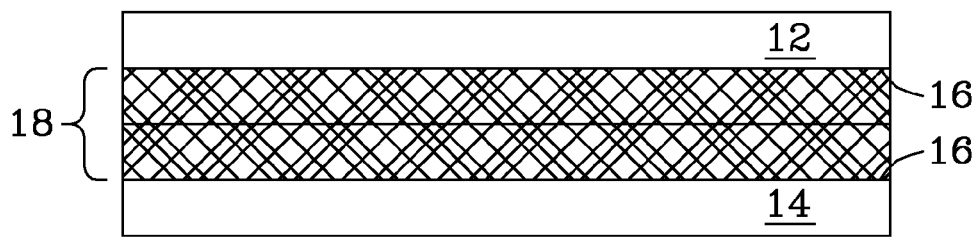
FIG. 2(a) is a side view of a second embodiment of the present invention.
Figure 2B:
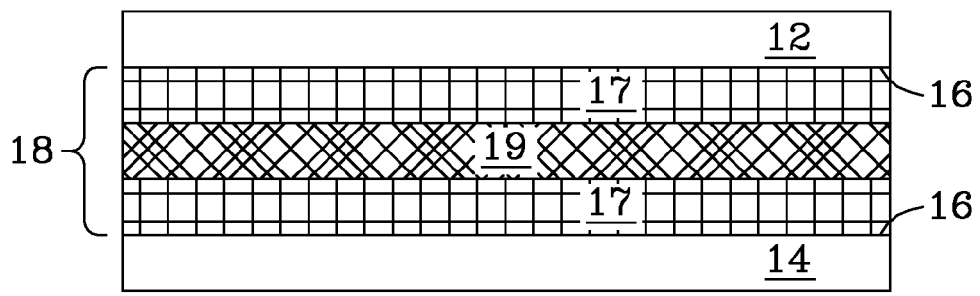
FIG. 2(b) is a side view of a third embodiment of the present invention.
Figure 2C:
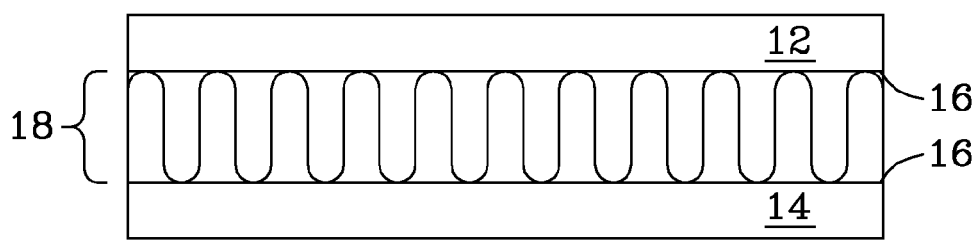
FIG. 2(c) is a side view of a fourth embodiment of the present invention.

FIGS. 2a-2c provide examples of various potential types of wicking structures that can be utilized within various applications according to the needs and necessities of a user. Referring first now to FIG. 2a, an embodiment is shown wherein the wick 18 is comprised of multiple layers of expanded metal foils that are stacked together, and preferably interconnected by a process such as brazing or diffusion bonding. While this embodiment is shown and described it is to be distinctly understood that the invention is not limited thereto but may be variously altered and configured.

FIG. 2b shows a wick wherein layers of various types of materials having varying features and porosities are interconnected and arranged so as to provide a wick with vapor and liquid passageways through at least one layer or structure. While in this case the layers are made from expanded metal meshes it is to be distinctly understood that the invention is not limited thereto but may be variously altered and configured according to the needs and necessities of a user. In this example, the wick 18 has an expanded foil core 19 which is surrounded by another material 17. Passageways 20, 22 extend throughout the various layers and provide the features of the present invention. In some embodiments, this additional material may be a bonding or a brazing material that connects the expanded foil with the sides of the chamber. It has been found in certain embodiments that having a tighter structure with lower porosity and smaller openings near the walls 14 will provide better phase separation capabilities at those locations where these features and characteristics are needed. In addition to these structures, a variety of other types of structures and materials that span the channel 16 but are not as significantly volume filling may also be utilized. These include but are not limited to embodiments where corrugated wick structures allow and accommodate vapor flow through the device. An example of such a structure is shown in an end view in FIG. 2c. While in each of these embodiments the configuration of these wicks may be variously configured, the wicks do substantially span the distance between the walls of the channel that define the channel and provide various scale length flow paths so as to allow vapor and liquid to travel separately.

In one embodiment of the invention, the evaporator is included in a fuel vaporizer/recuperator. Various views of this portion of the recuperator are shown in FIGS. 3(a)-(d). While in this described embodiment the devices were made from stainless steel it is to be distinctly understood that this recitation of the type of material from which the device was made is intended to be merely illustrative and not limiting in any way. In fact in various embodiments other materials with relatively high heat transfer indices such as aluminum, copper, and the like may also be utilized.

Figure 3A:
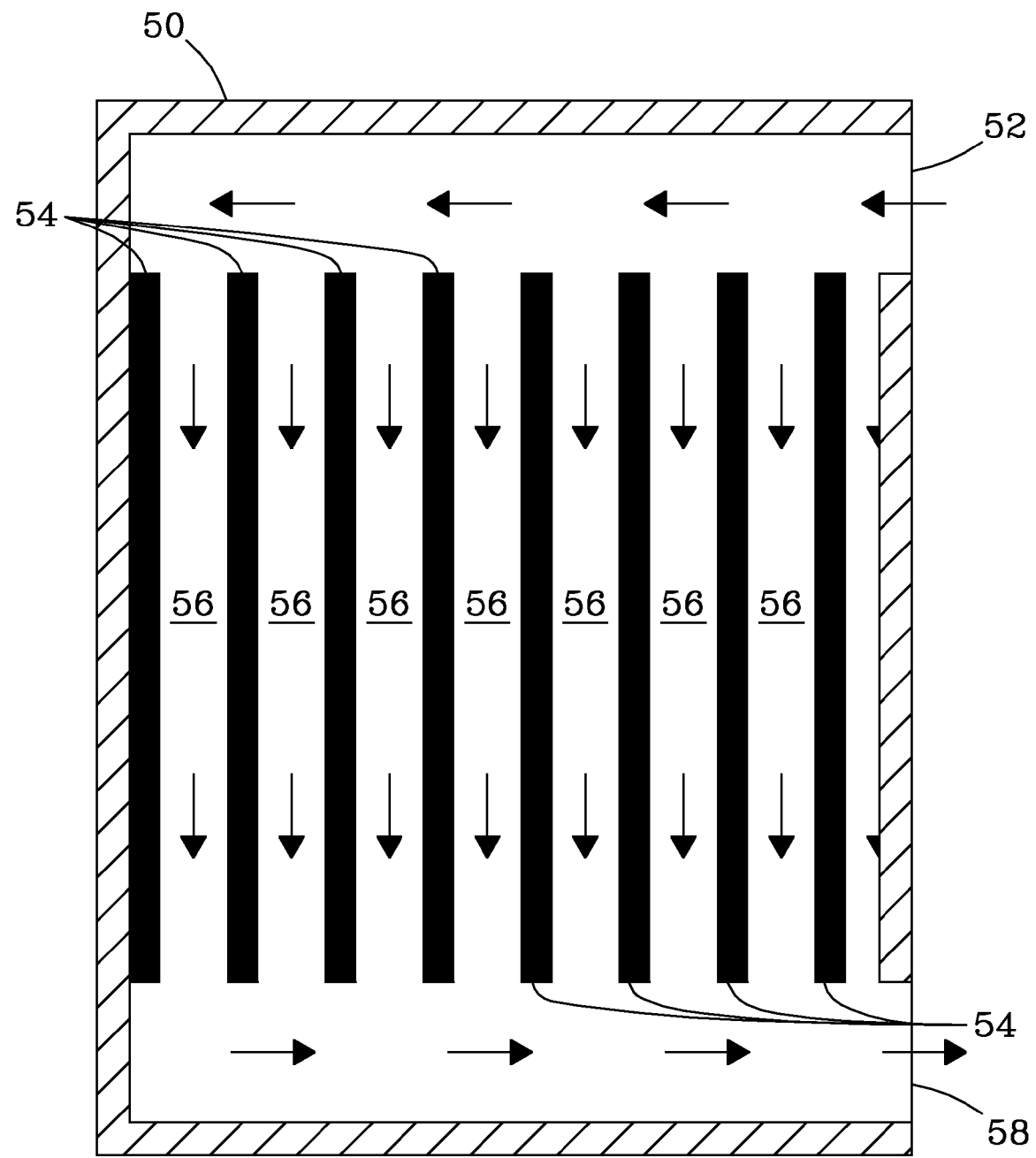
FIG. 3(a) is a view of the heat flow portion of a vaporizer that includes an embodiment of the present invention.
Figure 3B:
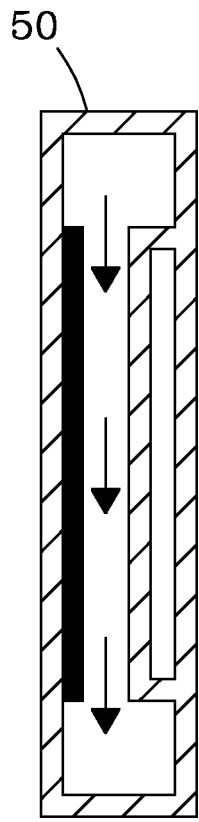
FIG. 3(b) is a side view of the vaporizer in FIG. 3(a)
Figure 3C:
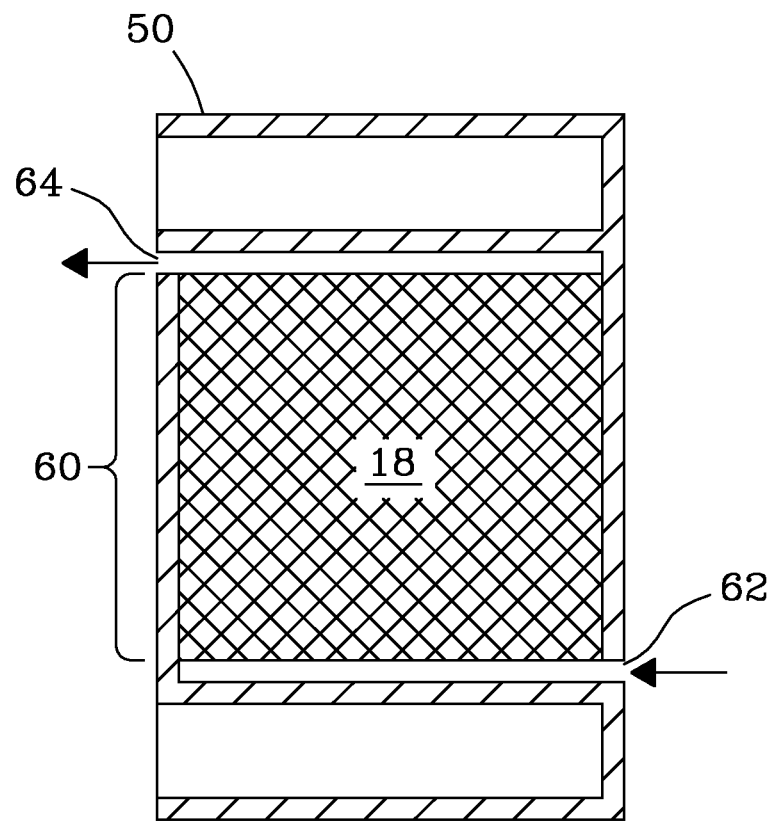
FIG. 3(c) is a view of the wick side portion of the vaporizer shown in FIGS. 3(a) and 3(b)
Figure 4:
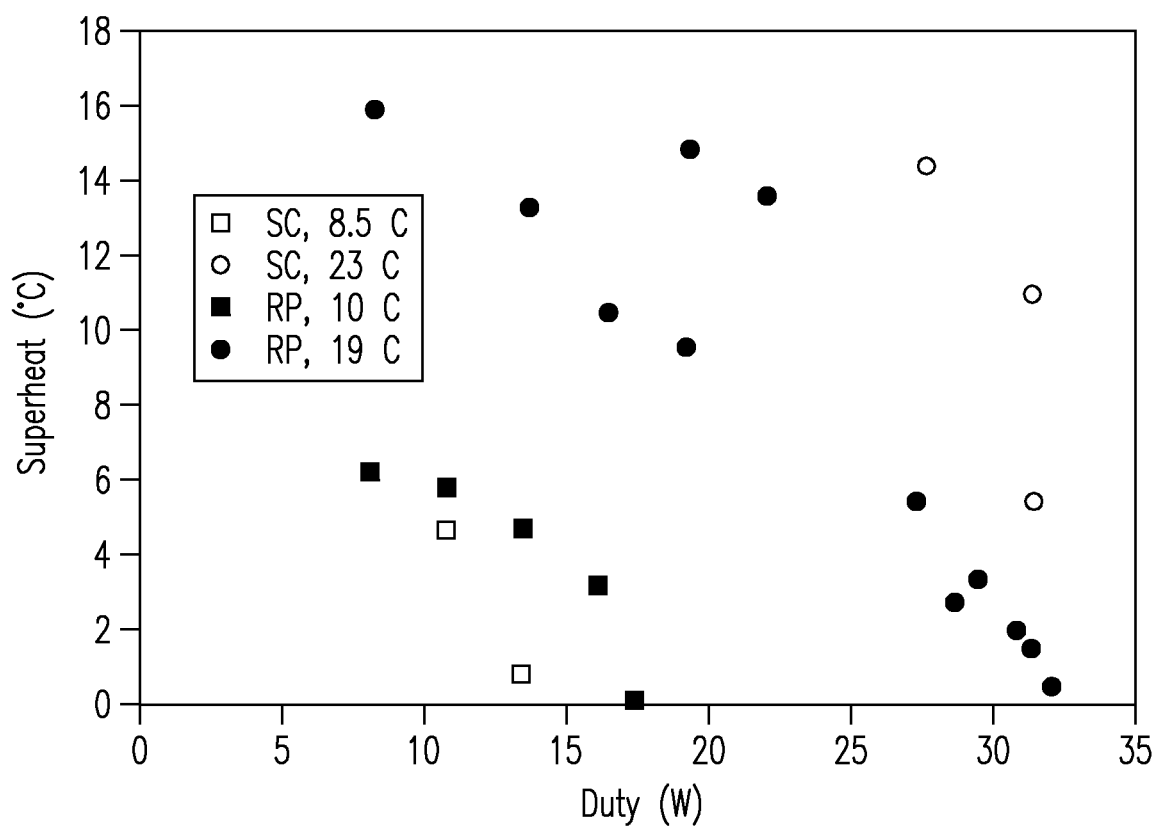
FIG. 4 is a chart showing the results of comparative testing of one embodiment of the present invention.

Referring now to FIG. 3(a) a first view of a portion of the vaporizer is shown this view demonstrates a structure having a hot gas inlet 52 a series of fins 54 which define hot gas flow channels 56 and a hot gas outlet 58. This device sits adjacent the wick area 60 (shown in FIG. 3c) and provides heat to the system so as to allow fuel vaporization to take place. FIG. 3c shows the wick portion 60 of the present invention wherein a fuel inlet 62 is connected to the wicking structure 18 which is placed within the channel 16.

Figure 3D:
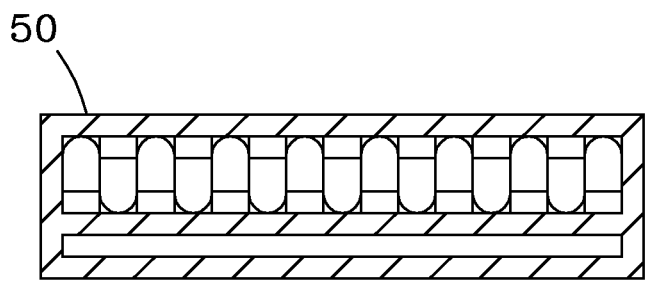
FIG. 3(d) is an end view of the vaporizer shown in FIGS. 3(a), 3(b) and 3(c).

As fuel enters through the fuel inlet 62 this fuel is heated by heat exchange from the hot air that flows within the hot gas channels 56 described earlier. As has been described previously, the vaporized fuel passes through the wick 18 in one set of capillary flow passageways 20, while liquid fuel remains and travels within a different set of capillary flow passageways 22. The vapor exits the device through the vaporized fuel exit 64. The liquid portions that have not yet vaporized remain by capillarity in the liquid flow channels in the wick 18 until they are heated to a vapor and then travel out of the device through the vapor fuel outlet 64. FIGS. 3b and 3d show side and end views of this same device.

These previously described embodiments of the present invention provide a low pressure drop (<1-2 in $H_2O$) evaporator that operates with minimal superheat and maintains stable operation without pressure or flow fluctuations. The wicking structures maintain open vapor flow paths, maximize heat transfer surface area, and retain liquid in contact with the heat transfer surfaces. When these wicking structures are used in conjunction with microscale channel dimensions, heat transfer performance is maximized while package size is minimized. This makes implementation useful in embodiments such as small scale heat pump cycles and other applications that are sensitive to pressure drop while utilizing a device that has a specified small size and weight.

The present invention avoids the problems associated with slugging that exists in the prior art devices. The higher permeability flow paths preferentially fill with vapor and maintain a path for vapor to leave the device without pushing liquid ahead of the vapor such as occurs during slug flow in forced convective boiling in channels of the prior art. This problem of slug flow is especially prominent in prior art microscale channels and can lead to pressure and mass flow surges that significantly degrade performance. Pressure surges are especially problematic in devices designed to operate with a low pressure drop. The present invention does away with these performance degrading characteristics. The wicking structures of the present invention also provide high surface area and small length scales of the low permeability flow paths to create capillary forces that preferentially keep liquid near the heat transfer surfaces thereby improving the overall heat transfer coefficient. This can improve heat transfer performance, reduce heat exchanger size, and minimizes entrainment of liquid droplets in the exiting vapor.

Several graded porosity wicking structures were tested in a counter flow micro channel based evaporator/vaporizer to measure the heat transfer performance and ascertain the ability of the wicking structures to suppress flow surges. The tests were conducted using water as the heating medium and methanol as the vaporizing fluid. For this testing, evaporator performance of the wicking structure of the present invention was compared to the performance of a similar evaporator that uses a single serpentine channel in place of the wicking structure on the vaporizing side of the device.

In one device the wicking structure consisted of sandwich of Delker expanded foil meshes. The meshes were diffusion bonded to produce a wick approximately 700 μm thick, and the mesh size was graded such that small openings are present next to the primary heat transfer surface. The layered expanded foils produce a structure with both larger openings and smaller openings, but may have limited permeability in the flow direction. This can be varied by utilizing a diffusion bonding process wherein the structure is compacted to the point that permeability along the wick is limited to very narrow flow passages. This creates a situation where vapor must pass though narrow liquid filled flow passages, consequentially, liquid is forced out in front of the vapor degrading performance. A more open wicking structure was also tested. This structure was fabricated using rapid prototype methods and consisted of interleaved open vapor flow passages where liquid wicking was maintained in the sharp corners of these open passages. The serpentine channel that was utilized in this testing was rectangular in cross section 1.2 mm wide×0.7 mm high×15.4 cm long.

The hot side heat transfer surface in these evaporators consisted of 8 rectangular channels 2.54 cm long×0.76 mm wide×3.0 mm high. A Neslab RTE-211 temperature control bath was used to maintain the inlet to the hot side heat transfer surface at a specified temperature. The water flow rate of 16 g/s was high enough to maintain the nearly isothermal conditions on the hot side. On the vaporizing side, room temperature methanol was fed into the device using a syringe pump. The temperatures of inlet and outlet streams were measured using type T or type K thermocouples. The measured temperatures and flow rates allow the calculation of heat transfer performance. Vaporizer duty was calculated using ChemCad process simulation software with the experimental flow rates and temperatures as input values. The flow stability in the different devices was also observed by looking at pressure fluctuations on the methanol inlet and spitting or pulsation in the exiting vapor.

Performance curves were made by increasing the syringe pump flow rate resulting in increased duty and decreased vapor exit temperature. The test procedure involved increasing the flow of methanol until the exhaust temperature dropped to the normal boiling point of methanol, indicating the presence of liquid methanol at the vapor exit. The methanol flow rate was increased in stages with the objective of finding the lowest stable vapor outlet temperature above the normal boiling point (minimum superheat needed for complete vaporization). This point represents a maximum in performance for a given temperature driving force. The heat transfer driving force was also changed by increasing or decreasing the temperature of the bath supplying water to the hot side of the evaporator.

The performance of these devices showed more stable performance at lower heat transfer rates, and it was possible to operate wicking and the serpentine channel devices with low superheat (<2° C. when hot side temperatures were maintained such that the temperature driving force for vaporization was around 10° C. However, the serpentine channel showed greater flow and pressure fluctuations compared to wicking devices. Fluctuations in vapor flow were evidenced by periodic whistling at the vapor exit occurring every 1 to 2 seconds. Large pressure fluctuations at the methanol inlet were also present. The pressure drop in the serpentine channel was greater than 5 in $H_2O$; however, this measurement was confounded by the pressure fluctuations.

The wicking devices showed evaporation side pressure drops under 1 in $H_2O$ and experienced less severe pressure fluctuations. Experiments that used hot air to heat the device showed no pressure fluctuations in wicking devices when the temperature at the methanol inlet was maintained low enough to prevent significant vaporization in the inlet header. At higher heat flux rates device performance diverged significantly. With a roughly 20° C. temperature driving force for vaporization, the serpentine channel experienced severe pressure fluctuations and at least 5° C. of superheat was required to prevent the presence of liquid droplets in the exiting vapor. In contrast, the wicking structure was able to operate with less than 1° C. superheat.

The wicking evaporator with the expanded foil wicking structure showed heat transfer performance similar to that of the serpentine channel while the pressure drop on the vaporizing side was lower than that of the serpentine channel. Despite these similarities, the serpentine device could not be operated at superheat values under 5° C. without the presence of liquid droplets at the vapor exit when a temperature driving force around 20° C. was used.

FIG. 4 shows a comparison of the observed performance of the rapid prototyped wick, and the serpentine channel. It was observed that the wicking evaporator was able to operate at much lower values of superheat at higher duties (heat flux rates). This is due to the wicking device having significantly lower pressure and flow fluctuations at the vapor exit. The wick has a fairly open structure and it is believed this allows for a vapor escape path relatively unobstructed by liquid. The overall heat transfer coefficient for vaporization in the rapid prototype wicking device was calculated to be in the range of 7600 to 18000 $W/m^2 \cdot K$. The overall heat transfer coefficient for the serpentine channel was calculated to be around 5000 $W/m^2 \cdot K$. These calculated values are based on the primary heat transfer area, and those for the serpentine channel are in line with literature values for forced convection in channels.

The higher heat transfer coefficient for the wicking structure is attributable to a significantly higher secondary heat transfer area compared to the serpentine channel. This result indicates that convective movement of liquid in the serpentine channel was high enough to prevent vapor bubbles from blocking access to the surface. There may be room for improving the performance of wicking evaporators with better designed wicks. For instance, increasing the percentage of narrow liquid preferring flow paths, increasing the volume of liquid preferring flow paths, while retaining the larger open structures required for vapor flow and other similar modifications may enhance performance of the device. Interconnected vapor flow paths that are unobstructed by liquid are also useful in achieving the previously mentioned benefits.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A heat exchanger comprising: a structure having at least one wall that defines at least one channel, the channel containing a wick comprising plural layers that define at least two capillary flow passageways of differing capillary diameters, the capillary flow passageways configured to wick liquid at different rates whereby the liquid and the vapor are separated within the channel by the wick, and wherein the layers define offset, substantially planar surfaces, such that when adjacent layers are stacked together, the facing offset surfaces are spaced apart to form narrow capillary passages there between for the flow of the liquid along a direction which is coplanar with one of the adjacent layers, while larger diameter through passages defined in the layers form vapor passages permitting vapor flow within the same plane as the liquid flow.

2. The heat exchanger of claim 1 wherein said wick is proportioned to substantially fill a volume of said channel and to be in intimate contact with said wall.

3. The heat exchanger of claim 1 wherein said wick is brazed, welded, bonded, soldered or diffusion bonded to said wall.

4. The heat exchanger of claim 1 wherein said wick is made of a high thermal conductivity material.

5. The heat exchanger of claim 1 wherein said high thermal conductivity material is selected from the group consisting of aluminum, copper, and the like.

6. The heat exchanger of claim 1 wherein said wherein two phase flow of liquid is enhanced without superheating.

7. The heat exchanger of claim 1 wherein said heat exchanger is an evaporative heat exchanger.

8. The evaporative heat exchanger of claim 7 wherein said wick is proportioned to substantially fill a volume of said channel and to be in intimate contact with said wall.

9. The evaporative heat exchanger of claim 7 wherein said wick is brazed, welded, bonded, soldered or diffusion bonded to said wall.

10. The evaporative heat exchanger of claim 7 wherein said wick is made of a highly thermally conductive material.

11. The evaporative heat exchanger of claim 10 wherein said high thermal conductivity material is selected from the group consisting of aluminum, copper, and the like.

12. The evaporative heat exchanger of claim 7 wherein said wherein two phase flow of liquid is enhanced to obtain complete vaporization of the liquid without superheating the vapor by more than 2° C.

13. An evaporative heat exchanger comprising: at least one wall that defines at least one channel, the channel containing a wick comprising plural layers made from thermally conductive material that defines at least two capillary flow passageways of differing capillary diameters, the wick being proportioned to substantially fill a volume of the channel and to be in intimate contact with the wall, the capillary flow passageways of the wick being configured to wick liquid at different rates whereby the liquid and the vapor are separated within the channel by the wick, and wherein the layers define offset, substantially planar surfaces, such that when adjacent layers are stacked together, the facing offset surfaces are spaced apart to form narrow capillary passages there between for the flow of the liquid along a direction which is coplanar with one of the adjacent layers, while larger diameter through passages defined in the layers form vapor passages permitting vapor flow within the same plane as the liquid flow.

14. The heat exchanger of claim 13 wherein said wick is brazed, welded, bonded, soldered or diffusion bonded to said wall.

15. The heat exchanger of claim 13 wherein said high thermal conductivity material is selected from the group consisting of aluminum, copper, and the like.

16. A wick comprising plural alternating layers of heat conducting material that define at least two capillary flow passageways of differing capillary diameters, the capillary flow passageways configured to wick liquid at different rates whereby the liquid and the vapor are separated within the channel by the wick, and wherein the layers define offset, substantially planar surfaces, such that when adjacent layers are stacked together, the facing offset surfaces are spaced apart to form narrow capillary passages there between for the flow of the liquid along a direction which is coplanar with one of the adjacent layers, while larger diameter through passages defined in the layers form vapor passages permitting vapor flow within the same plane as the liquid flow.

17. The heat exchanger of claim 1 wherein said heat exchanger is condensing heat exchanger.

* * * * *